Patented Feb. 3, 1931

1,791,372

UNITED STATES PATENT OFFICE

ALFRED PAUL, JR., OF DOUGLAS, ARIZONA

BRICK AND METHOD OF MAKING SAME

No Drawing.     Application filed May 29, 1929.   Serial No. 367,147.

This invention relates to a brick and the method of making the same.

An object of the invention is the provision of a brick formed of volcanic ash and hydrated lime.

Another object of the invention is the provision of a brick of great strength, light in weight, and having insulating and sound-deadening qualities, said bricks having a low degree of absorption.

A further object of the invention is the provision of a brick formed from predetermined proportions of hydrated lime and volcanic ash which have been molded into a wet mass and subjected to the action of steam under pressure in a closed retort.

This invention will be best understood from a consideration of the following detailed description forming a part of the specification; nevertheless it is to be understood that the invention is not confined to the disclosure, being susceptible of such changes and modifications which shall define no material departure from the salient features of the invention as expressed in the appended claims.

In carrying out my invention I preferably use a material which is light in weight and porous and in a granular state and also having voids of varying capacities thus presenting at its surface relatively hard projections. The material preferably employed is that known as volcanic ash.

The ash is thoroughly mixed with hydrated lime whereby the lime will not only saturate the porous material but will fill in the voids so that when the lime has become hard under pressure at a predetermined degree of heat, a brick will be formed which is light in weight, having a low degree of absorption and slight heat conductivity, sound proofing qualities and great strength.

From 85% to 90% of volcanic ash is mixed with 15% to 10% of lime such as calcium oxide and these ingredients are placed in a mixing machine to which is added the proper quantity of water. After the ingredients are thoroughly mixed the mass is then discharged into a silo and permitted to hydrate in a natural manner. Steam, of course, will be generated from the mixture and after a predetermined period the mass is then run into molds and compressed to form bricks.

Another method of carrying out the invention is taking the proper proportions of lime and volcanic ash after the ash has been broken up to the proper size and placing the ingredients in a mixing drum which has a cover adapted to be bolted in position. Water is admitted to the drum in measured quantity as determined by tests and the drum is set in motion whereby the mixing and slaking is completed in a short time. Steam of course is created in this mixing drum and the pressure gradually decreases until the slaking has been completed when the steam is allowed to escape. The thoroughly mixed mass of ingredients is then discharged from the drum and placed in the molds where the mass is pressed into shape to form the bricks. The wet or green bricks are then placed in drums and steam under pressure is admitted to steam-tight drums or hardening cylinders and the bricks remain under a steam pressure of approximately 120 lbs. at a temperature of approximately 300° Fahrenheit for eight hours or more after which they are removed and are then ready for use.

The final product will be a brick of grayish pink color which may be converted into any color desired by suitable pigments. The plastic mass obtained from the mixing drum may be employed also for the manufacture of hollow tile or bricks which are normally employed as an auxiliary wall for backing up the main wall and where strength is not the main factor. When used in this manner a very light building material is had. When the materials are so employed less pressure is required.

The bricks thus constructed improve with age and have great crushing strength while being light in weight and low in absorption. Furthermore, these bricks provide a better bond with mortar and when so used or exposed to the atmosphere or weather do not scale or do not disintegrate under extreme climatic change. The bricks made from these materials and in the manner described are particularly economical due to the fact that they are produced with a uniformity of size, shape, and color.

The sizes of the granules will be such that they may be passed through a 40" mesh to a ¾" mesh screen. The rough surfaces of the volcanic ash together with the great quantity of voids included therein add materially in cooperation with the hydrated lime to form a bond between the particles while a certain quantity of the hydrated lime fills certain portions of the porous materials. The cores or centers are sufficiently free of the hydrated lime to carry a definite quantity of the air to provide sound-proofing qualities while creating additional strength and lightness in the finished product.

The highly porous materials used in conjunction with the hydrated lime may be made artificially by blowing a gaseous medium or vapor and air through a plastic material such as any of the well known forms of cement.

The materials are not only intended to be formed into bricks or hollow tile but they may be molded into various shapes for flooring or roofing purposes or for the manufacture of articles.

I claim:

1. A brick formed under pressure and of particles of volcanic ash being of such a size that they will pass a forty inch mesh to a three-fourths inch mesh screen, the particles having irregular surfaces and voids of varying capacities with the voids at the surface being filled with hydrated lime and thereby interlocked with said lime, the interior voids of the particles being free of lime thereby providing air pockets, the proportions of the lime being approximately 10 to 15% of the quantity of the ash.

2. The method of manufacturing bricks which comprises breaking up highly porous and light material such as volcanic ash into small particles, incorporating approximately from 10 to 15% unslaked lime with 90 to 85% of the small particles of the ash, adding water to the incorporated mixture in a closed space, thoroughly agitating the mass while retaining the steam formed by the slaking of the lime, under pressure with the agitated mass, molding the mass into bricks, then subjecting the molded bricks to the action of steam under pressure.

3. The method of manufacturing bricks which comprises breaking up highly porous and light material such as volcanic ash into small particles, incorporating unslaked lime with the small particles of the ash, adding water to the incorporated mixture, thoroughly agitating the mass while retaining the steam formed by slaking of the lime under pressure with the agitated mass, molding the mass into bricks, then subjecting the molded bricks to the action of steam under pressure.

ALFRED PAUL, Jr.